United States Patent [19]
Banks

[11] 3,719,101
[45] March 6, 1973

[54] CLUTCH ACTUATOR FOR A GEARED POWER TRANSMISSION MECHANISM

[75] Inventor: Eric John Banks, Thorpe Bay, England

[73] Assignee: Ford Motor Company, Dearborn, Mich.

[22] Filed: Aug. 30, 1971

[21] Appl. No.: 176,085

[30] Foreign Application Priority Data

Oct. 7, 1970 Great Britain....................47,636/70

[52] U.S. Cl...........................................74/337.5
[51] Int. Cl...........................................F16h 5/08
[58] Field of Search...............192/63 A, 97 A, 70.23; 74/337.5

[56] References Cited

UNITED STATES PATENTS 2,216,314 10/1940 Gustafson........................74/337.5 X
3,191,451 6/1965 Dluhosch............................74/337.5
3,336,813 8/1967 Almenar et al......................74/337.5

FOREIGN PATENTS OR APPLICATIONS 961,773 3/1957 Germany............................74/337.5

*Primary Examiner*—Leonard H. Gerin
*Attorney*—Keith L. Zerschling et al.

[57] ABSTRACT

A transmission clutch adapted to connect selectively a rotary gear member of a transmission mechanism to either a torque delivery shaft or a companion gear member during ratio changes comprising an actuator having an externally splined clutch element within an internally splined clutch sleeve, the former being connected to one torque delivery member, adjacent clutch elements carried by two other torque delivery members, a cam sleeve surrounding the internally splined clutch sleeve and pressure operated servo means for angularly adjusting the cam sleeve to effect axial shifting movement of the internally splined sleeve into and out of clutching engagement.

2 Claims, 2 Drawing Figures

1
33
37
35
31
29
15
27
25
17
5
9
3
23
18
19
21
2
7
15

11
47
49
45
39
57

53
51
55
31
43
41
37
29

CLUTCH ACTUATOR FOR A GEARED POWER TRANSMISSION MECHANISM

GENERAL DESCRIPTION OF THE INVENTION

The clutch actuator of my invention is adapted especially to be used in effecting ratio changes in a manually operated power transmission mechanism of the type found in heavy duty truck vehicles. These transmission mechanisms may include a torque input gear that is continuously in meshing engagement with a countershaft gear mounted for rotation about an axis that is offset and parallel to the common axis of the torque input shaft and the torque output shaft. Torque output gears are journalled rotatably on the torque output shaft. These engage continuously the gear elements of the cluster gear assembly.

In a conventional transmission mechanism of this type, synchronizer clutch elements are used to clutch together the torque output shaft and one of the several output torque gears, depending upon which ratio is desired. A synchronizer clutch mechanism is used also for establishing a driving connection between the torque input gear and the torque output shaft during direct drive operation. Such synchronizer clutch mechanisms employ friction clutches for bringing the rotating clutch members into synchronous motion prior to completion of the clutching action. The friction surfaces of the synchronizer clutch structure thus must absorb a substantial amount of energy due to the presence of inertia forces. A synchronizer clutch structure used in environments of this type are relatively costly and they consume space. They have a relatively reduced operating life compared to the other torque transmitting elements of the gearing.

The synchronizer clutch structure of conventional designs employs shift rails and shift forks carried by the shift rails for shifting axially the movable clutch collar. The improvement of my invention eliminates the need for such shift forks and shift rails. It employs instead a rotary cam ring mounted in an internal wall in the transmission housing for rotary adjustment about the axis of the power output shaft. A cam follower is formed on a clutch sleeve which carries internal clutch teeth. These register slidably with an externally splined clutch element situated adjacent two intermediate torque delivery elements, each of which carries external clutch teeth. The pitch diameter of the clutch teeth on the torque delivery elements is substantially the same as the pitch diameter of the external clutch teeth on the clutch sleeve. Upon rotary adjustment of the cam ring, the clutch sleeve will be adjusted axially thereby causing clutching engagement between the external clutch teeth and the internal teeth of the clutch sleeve. Thus the externally splined clutch element is connected positively to either one or the other of the torque delivery elements. The torque output shaft in turn is splined directly to the externally splined clutch member.

Rotation of the cam ring thus performs the same function as the axial shifting movement of the shift fork or shift rail of a conventional transmission mechanism such as the one shown in U.S. Pat. No. 3,292,446.

I expect that the improved clutch actuator of my invention may be used in a transmission system of the type shown in my co-pending application Ser. No. 176,084, filed Aug. 30, 1971, entitled "Motor Vehicle Transmission". That co-pending disclosure describes circuitry for effecting shifting movement of the ratio changing clutches when synchronism is established between two torque delivery elements to be clutched together. Synchronism is achieved by means of an electronic logic circuit which receives the output signal of an input speed sensor and the output signal of the output speed sensor and triggers an appropriate shift inhibitor when synchronism is established, thereby permitting the operator to effect ratio changes with the usual gear shift linkage mechanism.

The transmission mechanism disclosed in this specification may employ speed sensors and the electronic logic circuit previously described in my co-pending application, although the shifting itself is accomplished in my present invention by means of a hydraulically activated shift actuator rather than by a conventional shift fork and gear shift linkage mechanism.

PARTICULAR DESCRIPTION OF THE INVENTION

Figures 1, 2:
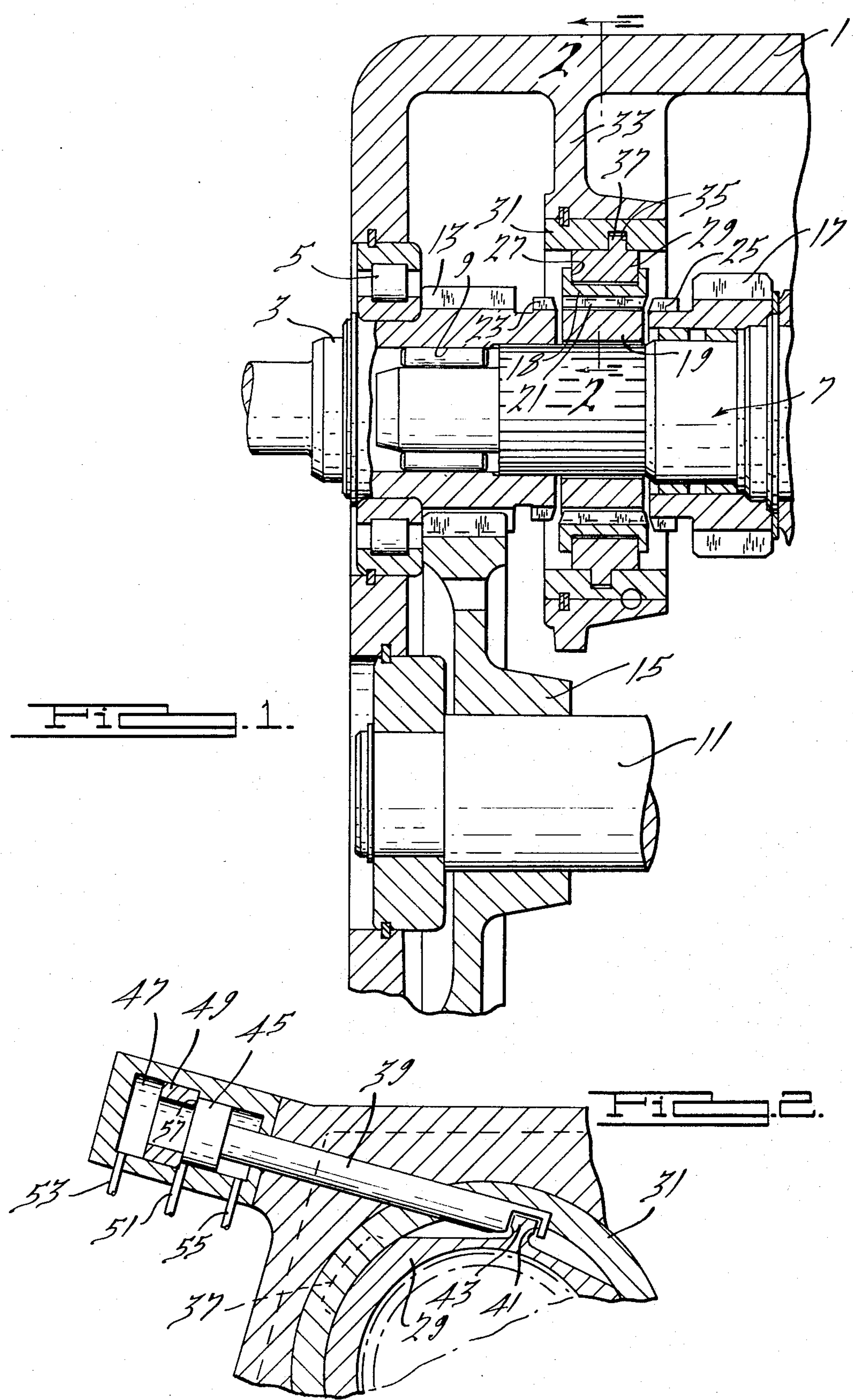
FIG. 1 shows in longitudinal cross-sectional view a portion of a transmission gearing arrangement adapted to incorporate the improved shift actuator of my invention.
FIG. 2 is a cross-sectional view taken along the plane of section line 2—2 of FIG. 1.

The assembly shown in FIG. 1 includes features that are essentially common to a conventional gearbox for heavy duty trucks. It lacks, however, the usual synchromesh devices and the usual shift forks and shift rails.

The gearbox has a casing 1. An input shaft 3 is supported by roller bearings 5 in a front wall of the casing; and an output shaft 7 is rotatably supported at one end in a counterbore 9 in the input shaft 3 and at the other end (not shown) is supported by roller bearings in the rear wall of the casing. A conventional layshaft 11 part only of which is shown, is supported in the conventional manner by roller bearings in the front and rear walls of the gearbox.

A gear 13 on the input shaft 3 meshes with a gear 15 on the layshaft. Other gears on the layshaft mesh with gears rotatably mounted on the output shaft 3. Only one of the latter gears is shown at 17.

The output shaft 7 can be connected to the input gear 13 or to the gear 17 by a clutch ring 18. When the gear 13 is connected to the shaft 3 there is a direct drive in the gearbox: when the gear 17 is connected to the shaft 3 there is a reduction gear ratio.

A toothed member 19 has internal splines that engage external splines on the shaft 7 and external teeth 21. The clutch ring 18 has internal teeth that mesh with the external teeth 21, and is slidable axially in either direction along the teeth 21. When slid to the left, the internal teeth of the ring 18 engage teeth 23 on the input shaft 3; when slid to the right, the internal teeth engage teeth 25 on the gear 17.

There is a U-shaped groove 27 on the external surface of the clutch ring. An annular cam element 31 is fixed to an internal wall 33 of the casing. A spiral groove 35 is formed in the element 31, and a radial projection 37 from the annular member 29 projects into the spiral groove 35. Thus as the annular member 29 is rotated about its axis, it is moved axially. When it moves axially, it slides the clutch ring 18 axially to establish direct drive or the reduction gear ratio. Other gear ratios are engaged in a similar manner.

The annular member 29 is rotated by the arrangement shown in FIG. 2. A rod 39 is axially slidable in a side wall of the casing and has a recess 41 at its inner end. A lug 43 from the member 29 extends into the recess 41. Thus when the rod 39 is moved axially, the member 29 is rotated. As the member 29 rotates, the lug 43 moves axially with respect to the axis of the shaft 3. This axial movement of the lug 43 is allowed for by making the end of the rod 39 T-shaped and forming the recess in the bar of the T.

In the arrangement shown, the axis of the rod 39 lies in a plane perpendicular to the axis of the shaft 3, and axial movement of the lug 43 is allowed for by forming the recess 41 in the T-shaped end of the rod. In an alternative arrangement, the plane in which the rod 39 lies is inclined to the axis of the shaft 30 so that axis of the rod is aligned with a length of the groove 35. In this arrangement, the axial movement of the recess 41 is approximately equal to the axial movement of the lug 43.

The rod 39 is moved by hydraulic pressure. It carries a piston 45 slidable in a stepped cylinder 47. Also slidable in the cylinder 47 is a sleeve 49. The cylinder has a central exhaust passage 51 and two passages 53 and 55 connectible to a source of fluid pressure. When the pressure source is connected to the passage 53 and the passage 55 is connected to exhaust, the piston 45 is moved to the right to engage one gear ratio: when the pressure source is connected to the passage 55 and the passage 53 is connected to exhaust, the piston 45 is moved to the left so that the sleeve engages an end wall of the cylinder to establish another gear ratio. When both passages 53 and 55 are connected to the pressure source, the piston 45 assumes the intermediate position shown in which the gearbox is in neutral. The pressure in the left hand end of the cylinder holds the sleeve in the position shown against the step 57 while the pressure in the right hand end of the cylinder holds the piston 45 against the sleeve 49.

What I claim and desire to secure by U.S. Letters Patent is:

1. A geared power transmission mechanism for delivering torque from an engine powered input shaft to a power output shaft in an automotive vehicle driveline, a power output gear journalled for rotation on said power output shaft, a power input gear connected to said power input shaft, said power output shaft and said power input shaft being coaxially arranged, a housing surrounding said shafts and rotatably supporting the same, an internal wall in said housing, said output gear and said input gear having sets of external clutch teeth, a clutch hub with external splined teeth connected to said power output shaft and located intermediate said sets of external clutch teeth, a clutch ring having internal clutch teeth slidably supported on said hub adapted for clutching engagement with either of said sets of clutch teeth upon axial adjustment thereof, a rotary cam ring surrounding said clutch rings, one of said rings having a helical groove and the other ring having a cam follower registering with said groove, and servo means for adjusting the relative angular positions of said rings, thereby effecting axial adjustment of said internal clutch teeth to effect selective clutching engagement of said output shaft with said input and output gears.

2. The combination as set forth in claim 1 wherein said servo means comprises an actuator rod extending in a generally tangential direction with respect to one of said rings, a piston carried by said rod, a pressure cylinder receiving said piston, passage structure for distributing pressure to either side of said piston to effect movement of said actuator rod in either direction along a tangential line of motion.

* * * * *